Patented Jan. 16, 1940

2,187,455

UNITED STATES PATENT OFFICE 2,187,455

ARYLIDES OF 2,3-HYDROXYNAPHTHOIC ACID

Walter Kern, Sissach, and Richard Tobler, Riehen, Switzerland, assignors to the firm of Society of Chemical Industry in Basle, Basel, Switzerland No Drawing. Application May 21, 1938, Serial No. 209,376. In Switzerland June 2, 1937

4 Claims. (Cl. 260—560)

It has been found that arylides of 2,3-hydroxynaphthoic acid of the general formula

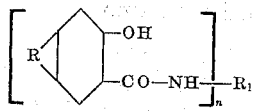

wherein R stands for a phenylene radical, $R_1$ for the radical of a hydrocarbon having four angularly fused six-membered rings, and $n$ for the Figures 1 to 2, may be obtained by causing 2,3-hydroxynaphthoic acid which may be substituted in the hetero-nucleus for example by halogen or alkoxy groups, or its functional derivatives, such as for instance the halides, to react with amines of hydrocarbons having four angularly fused six-membered rings. Such amines are for example 3-aminopyrene, 4-aminopyrene, 3,8-diaminopyrene, 2,8-diaminochrysene, 2-aminochrysene, as well as the nuclear substitution products thereof which may contain for instance halogen, such as chlorine or bromine, alkoxy groups, such as methoxy or ethoxy groups, or nitro groups as substituents. The conversion may be effected in the usual manner, for instance in the presence of tertiary bases, such as for example pyridine. If diamines are used there may be used for 1 mol of the diamine 2 mols of the 2,3-hydroxynaphthoic acids or the functional derivatives thereof.

The arylides of the 2,3-hydroxynaphthoic acid thus obtained are characterized by their excellent affinity for the vegetable fiber, and they are capable of uniting with diazo-compounds to form azo-dyestuffs.

The following examples illustrate the invention, the parts being by weight unless otherwise stated, and the parts by weight being related to the parts by volume as is the kilo to the litre.

*Example 1*

82.5 parts of 2,3-hydroxynaphthoic acid chloride are introduced into 480 parts of pyridine at 10° C. while stirring, and stirring is continued for ½ hour at this temperature. 88 parts of 3-aminopyrene are then added, the temperature is raised to 118° C. and stirring is continued at this temperature for 2 hours in order to complete the reaction. After the reaction mixture has been cooled it is mixed with ice, acidified with sulfuric acid and filtered, and the insoluble matter is washed with water and finally with alcohol. In order to purify the reaction product it is extracted with a boiling solution of sodium acetate of 1 per cent strength, then made into a paste with alcohol in a mortar, and caustic soda solution of 30 per cent strength is then added until all is dissolved; the solution is then diluted with 4000 parts of water having a temperature of 50° C., animal charcoal is added and the whole is filtered. By acidifying the filtrate 2',3'-hydroxynaphthoyl-3-aminopyrene of the formula

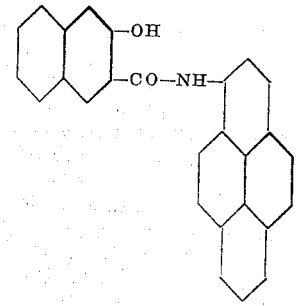

is obtained in good yield as a pale yellow powder of melting point 262–265° C.; it may be recrystallized from ortho-dichlorobenzene.

A similar product is obtained if the 3-aminopyrene is replaced by the 4-aminopyrene.

*Example 2*

82.4 parts of 2,3-hydroxynaphthoic acid chloride are introduced into 360 parts of pyridine at 10° C. while stirring, and stirring is continued for ½ hour at this temperature. 36 parts of 2,8-diaminochrysene (prepared by dinitration and reduction of chrysene) are added, the temperature is raised to 118° C. and stirring is continued for 3 hours longer at this temperature. After cooling the reaction mixture is filtered and the solid matter is washed with alcohol. The reaction product is dissolved in dilute caustic soda solution with the addition of alcohol, whilst heating, and the solution is filtered and acidified. Di-(2',3'-hydroxynaphthoyl)-2,8-diaminochrysene of the formula

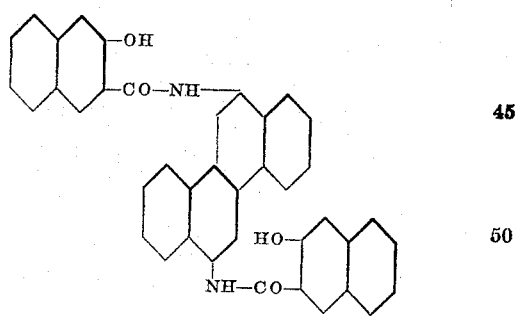

is thus obtained as a yellow powder of melting point 375–382° C.

Example 3

20.6 parts of 2,3-hydroxynaphthoic acid chloride are introduced into 100 parts of pyridine at 10° C. while stirring, and stirring is continued for ½ hour at this temperature. 13.2 parts of 3,8-diaminopyrene hydrochloride are then added, the temperature is raised to 118° C. and stirring is continued for 4 hours longer at this temperature. The reaction is now complete, and the product is precipitated by diluting the reaction mixture with water and acidifying it. The whole is filtered and the solid product is washed with water and then with alcohol. It is purified by extracting it with boiling dilute sodium acetate solution. There is obtained in good yield di-(2',3'-hydroxynaphthoyl)-3,8-diaminopyrene of the formula

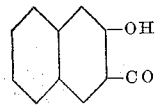
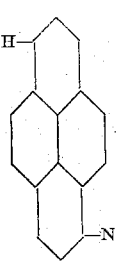
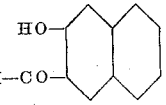

in the form of a brown powder which decomposes at 340° C. It may be recrystallized from nitrobenzene.

The diaminopyrene hydrochloride used in this example is prepared from pyrene by dinitration and reduction. In order to purify the hydrochloride it is dissolved in water, the base is precipitated by addition of ammonia and a small quantity of sodium hydrosulfite, quickly filtered, washed first with water containing sodium hydrosulfite and then with water and at once introduced into hydrochloric acid of 2 per cent strength in which the base dissolves. After some time the hydrochloride separates in a very beautiful form and may be isolated by filtering. A further quantity of the hydrochloride can be obtained from the mother liquor by salting out.

What we claim is:

1. The arylides of the 2,3-hydroxynaphthoic acid of the general formula

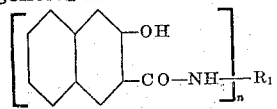

wherein $R_1$ stands for aryl radicals selected from the group consisting of the chrysene and pyrene series, and $n$ for the figures 1 to 2, which products are characterized by an excellent affinity for the vegetable fiber.

2. The arylides of the 2,3-hydroxynaphthoic acid of the general formula

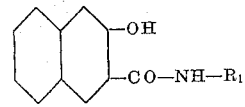

wherein $R_1$ stands for aryl radicals selected from the group consisting of the chrysene and pyrene series, which products are characterized by an excellent affinity for the vegetable fiber.

3. The arylides of the 2,3-hydroxynaphthoic acid, of the general formula

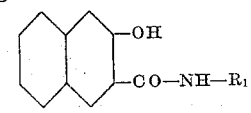

wherein $R_1$ stands for a pyrene radical which products are characterized by an excellent affinity for the vegetable fiber.

4. The arylide of the 2,3-hydroxynaphthoic acid of the formula

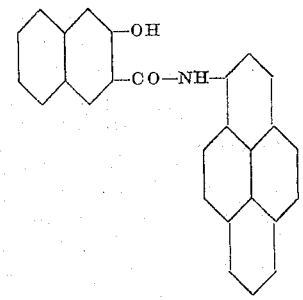

which product is characterized by an excellent affinity for the vegetable fiber.

WALTER KERN.
RICHARD TOBLER.